Aug. 30, 1966  A. T. KORNYLAK  3,269,502
CANTILEVER ROLLER CONFIGURATION FOR CONVEYOR ROLLERWAY
Filed Sept. 9. 1964  2 Sheets-Sheet 1

INVENTOR.
ANDREW T. KORNYLAK
BY
C. Chandlee Pidgeon
AGENT.

Aug. 30, 1966 — A. T. KORNYLAK — 3,269,502
CANTILEVER ROLLER CONFIGURATION FOR CONVEYOR ROLLERWAY
Filed Sept. 9, 1964 — 2 Sheets-Sheet 2

INVENTOR.
ANDREW T. KORNYLAK
BY C. Chandlee Pidgeon
AGENT.

United States Patent Office — 3,269,502 — Patented August 30, 1966

3,269,502
CANTILEVER ROLLER CONFIGURATION FOR CONVEYOR ROLLERWAY
Andrew T. Kornylak, Hamilton, Ohio, assignor to Kornylak Corporation, Hamilton, Ohio
Filed Sept. 9, 1964, Ser. No. 395,252
5 Claims. (Cl. 193—35)

This invention relates to a rollerway for a gravity type roller conveyor, and more particularly to a novel type of roller for such rollerway; a novel roller support and means for mounting rollers thereon.

An object of this invention is the provision of a rail of lightweight metal formed into a triangular tube.

Another object of this invention is the provision of means facilitating the mounting of rollers on the rail, to be readily detachable.

A further object of this invention is the provision of rollers formed of lightweight metal.

An additional object of this invention is the provision of a rollerway having frusto-conical rollers having a slope substantially equal to the slope of a side of the rail on which they are mounted.

Yet another object of this invention is the provision of double headed mounting axle pins for the rollers of a rollerway, the inner head being larger and having an annular groove engaging in a keyhole slot in the side of the rail.

A still further object of this invention is the provision of alternate flanged rollers, and intermediate flangeless rollers, the flanges providing side stops for the load travelling on the rollers, and the flangeless rollers permitting closer spacing.

It is a further object of this invention to provide an easily portable rollerway section having rollers thereon that are easily mounted or removed.

Another object of this invention is the provision of rollerways in a storage rack for ease in moving material into or out of such rack.

These and other objects will become apparent from a consideration of the following specification taken with the accompanying drawings, forming a part thereof.

In the drawings, wherein like parts are designated by like characters of reference in the several figures.

Figure 1:
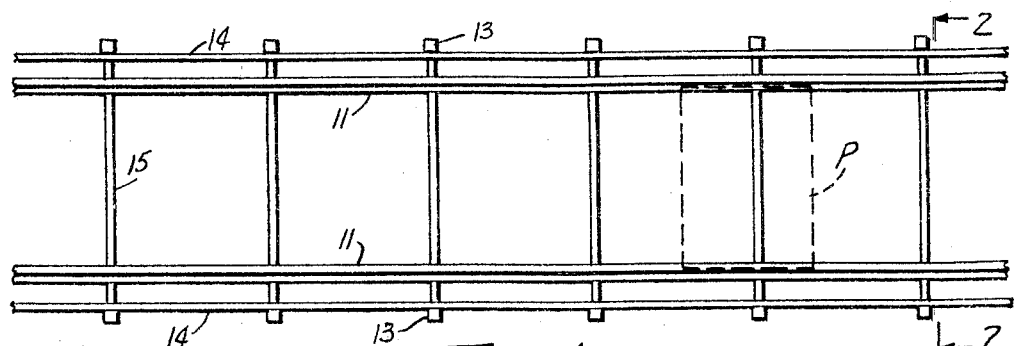
FIG. 1 is a plan view of a support for a rollerway, the rollers being omitted in the interest of clarity.
Figure 2:
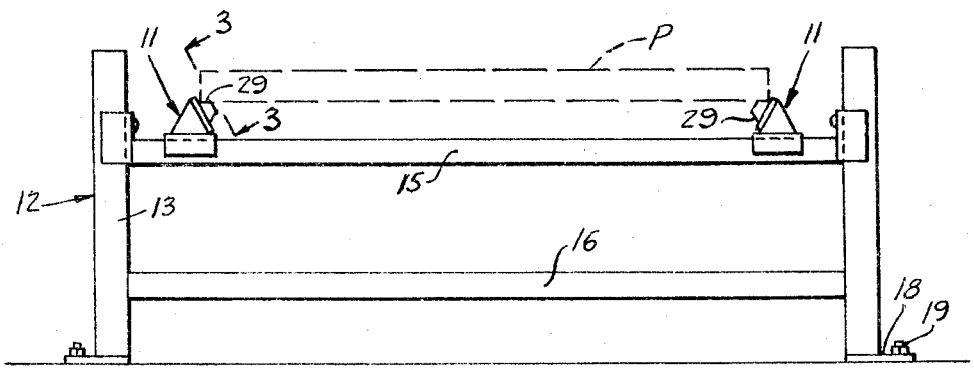
FIG. 2 is a section substantially on the line 2—2 of FIG. 1.
Figure 3:
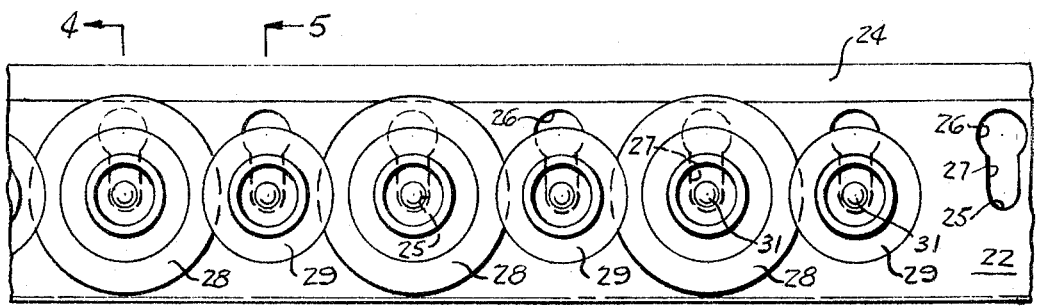
FIG. 3 is a fragmentary elevation of the rollerways as seen from line 3—3 of FIG. 2.

The conveyor 10 comprises a pair of rollerways 11, identical except for their allochiral arrangement. A description in detail of one only, is, therefore, necessary. The rollerways 1 are mounted on a framework 12 composed of legs 13, longitudinal frame members 14, and cross members 15. Braces 16 are employed to strengthen the framework. The cross bars 15 are attached to the legs 13 by means of brackets 17 secured to said legs 13 and to the cross members 15. The legs 13 are preferably provided with feet 18 fastened to the floor or base by means of screws 19.

The rollerways rails 20 are preferably formed of suitable sheet material bent into a tube of equilateral triangular cross section, having a base 21 and sides 22 and 23 welded or otherwise joined at the lapped portion 24. In the side 22, a plurality of longitudinally spaced keyhole slots 25 are formed, as by punching. The slots 25 have larger upper portions 26 and narrower lower portions 27.

Rollers 28 and 29 are mounted on pins 30 which have small heads 31 at their outer ends and larger heads 32 at their inner ends. The heads 32 have annular grooves 33 which engage the walls of the slots 25 at the smaller ends 27. The heads 32 are of a size to go through the larger openings 26 of the slots 25. To prevent accidental removal of the rollers 28 and 29, lugs 34 may be formed on the inner surface of the walls 22 as by the punching operation of joining the slots 25 or in any other suitable manner. A bar 35, retained by the lugs 34 rests against the heads 32. The rollers 28 are provided with radially extending flanges 36, while the rollers 29 are flangeless. The rollers 28 and 29 are frusto-conical, and of a cross section substantially that of a truncated equilateral triangle. Since the tubular rail 20 also has the cross section of an equilateral triangle, the line or rollers 28 and 29 will have their upper surfaces 37, 38 tangential to a common plane parallel to the base 21 of the rail 20. A pallet P will accordingly rest on a plurality of the rollers and may roll thereover.

Figure 6:
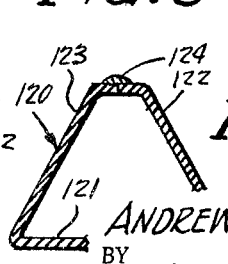
FIG. 6 is a fragmentary vertical section of a modified form of rollerway rail.

FIG. 6 shows a modification wherein the rail 120 has a bottom 121 and sides 122 and 123. The upper ends of the sides 122 and 123 are bent over for a butt weld as at 124. The rail 120 is otherwise like the rail 20.

Figure 7:
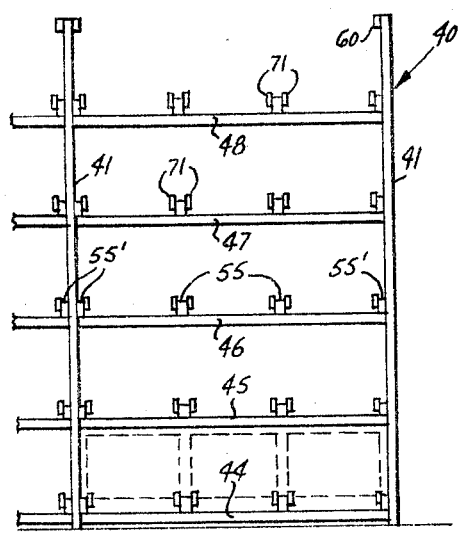
FIG. 7 is a front view of a storage rack with the rails of this invention.
Figure 8:
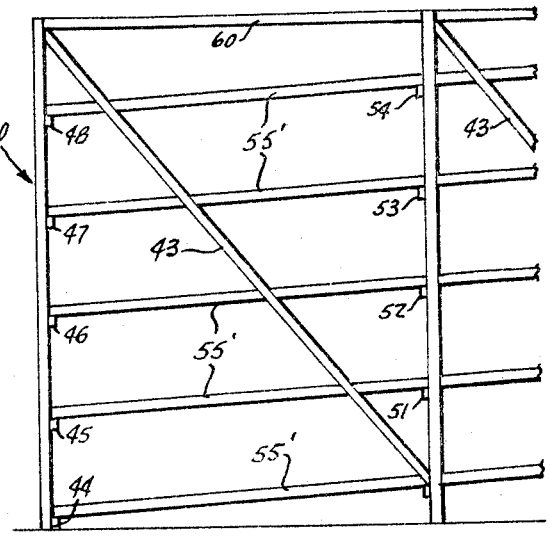
FIG. 8 is a side view of same.
Figure 9:
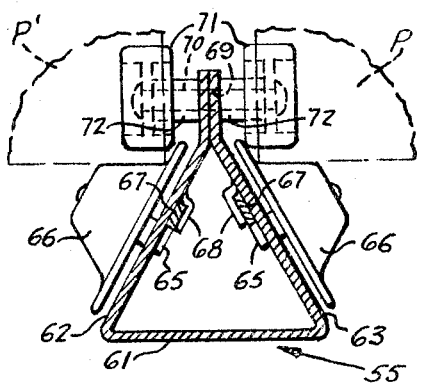
FIG. 9 is a detail of a rail having rollers on two sides.

The rails of this invention are very useful in connection with storage racks for stock rooms. FIGS. 7 and 8 show a rack 40 having upright members 41, 42 etc., according to the depth of the rack. Braces, such as 43 extend between pairs of uprights to strengthen them. The uprights 41, 42 etc. may be duplicated at intervals of a few feet lengthwise of the rack, as will also the braces 43, though they are not shown in either FIGS. 7 or 8. Rail supporting bars 44, 45, 46, 47 and 48 extend between the respective bars 41, 41, lengthwise of the rack 40. Other rails 50, 51, 52, 53, and 54 extend lengthwise of the rack and are secured to the uprights 42, 42 etc. The bars 50 to 53 are at a silghtly higher elevation above the floor than are the bars 44 to 48.

Figure 4:
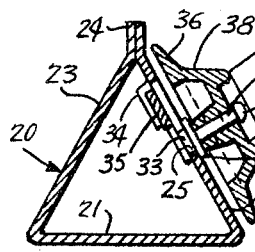
FIG. 4 is a vertical section substantially on the line 4—4 of FIG. 3.
Figure 5:
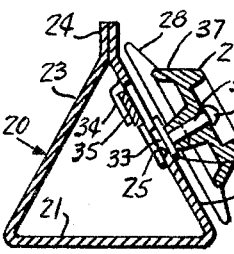
FIG. 5 is a vertical section substantially on the line 5—5 of FIG. 3.

Rails 55, similar to the rails 20 are mounted on the bars 44–48 and 50 to 54, and due to the difference in elevation of the bars 44–48 being less than that of the bars 50–54, the rails slope forwardly and downwardly, as clearly seen in slightly exaggerated scale in FIG. 8. Bars 60 extend rearwardly at the tops of the uprights 41, 42 etc., to assist in stabilizing the structure. Each rail 55 has a bottom 61, and sides 62 and 63, forming a hollow beam of triangular cross section. The sides 62 and 63 are extended vertically a short distance and welded or otherwise formed into a web 64. In this case, the web 64 may be higher at one end than the web 24 of FIG. 4. The sides 62 and 63 are both punched in the same manner as the side 22 above described, to hold the pins 65 of the rollers 66. Bars 67 retained by loops 68 retain the rollers against accidental displacement. The web 64 is punched as at 69 to accommodate a pin 70 which supports a pair of rollers 71 at the forward end of the rail 55. Sleeves 72 space the rollers 71 from the web. 64. The rails 55' at either end of a rack 40 will have but a single row of rollers 66 and 71.

A carton or pallet containing merchandise or other material will roll forward on rails 55, riding on the rollers 66. At the forward end of the rails, the rollers 71 stop the forward movement of such carton. In order to remove same it is necessary to lift it slightly and roll it forward over the rollers 71. For loading the rack 40, the material is lifted over the rollers 71 and pushed rearwardly on the rollers 66. Of course, the rail 55 may have, in addition to the rollers 66, other flangeless rollers as indicated in the modification of FIGS. 1 to 6.

Having described my invention in a preferred form, I desire it to be understood that changes may be made within the skill of the art and the scope of the appended claims.

I claim:
1. A rollerway for a roller conveyor comprising a tubular rail having a substantially equilateral triangular cross section and having a bottom and two sides, a plurality of keyhole slots formed in a longitudinal series in at least one side, rollers mounted on axles having small outer heads and large inner heads, annular grooves in said larger heads engaging the narrow portion of said keyhole slots to retain the rollers in position exteriorly of the rail whereby to form a cantilever support for said rollers.

2. The structure as defined in claim 1 wherein the rollers are frusto-conical and have cross sections substantially like the cross section of the rails the generatrix at the uppermost point of a roller being parallel to the base of the rail.

3. The structure as defined in claim 2 wherein alternate rollers have radial flanges, and the intermediate rollers are flangeless, permitting closer spacing of the rollers.

4. A roller conveyor for a storage rack comprising a hollow rail having a triangular cross section, mounted base down, the sides being extended vertically beyond the vertex to form a web, rollers mounted in at least one side, said rollers being truncated conical in axial section, and having a generatrix at the uppermost point parallel to the base, a pivot pin at one end of said web, above the level of the truncated conical rollers and a stop roller mounted on said pin.

5. The structure as defined in claim 4 wherein each of two sides of the rail is provided with truncated conical rollers and including two stop rollers, one at each side of the web.

References Cited by the Examiner
UNITED STATES PATENTS

| | | | |
|---|---|---|---|
| 2,309,723 | 2/1943 | Wilson | 193—35 |
| 2,717,071 | 9/1955 | Cook | 193—35 |
| 2,786,578 | 3/1957 | De Graff et al. | 193—35 X |
| 2,969,863 | 1/1961 | Woodring et al. | 193—35 |
| 2,983,352 | 5/1961 | De Flora et al. | 193—35 |
| 3,117,662 | 1/1964 | Wohl et al. | 193—37 |

EVON C. BLUNK, *Primary Examiner.*

SAMUEL F. COLEMAN, *Examiner.*

A. L. LEVINE, *Assistant Examiner.*